United States Patent [19]

Hinds, Jr. et al.

[11] 4,232,051

[45] Nov. 4, 1980

[54] METHOD OF SEPARATING LIQUID FROM SOFT PARTICULATE FOOD SOLIDS

[75] Inventors: Horace Hinds, Jr., Menlo Park, Calif.; David P. Heimerman, Chilton, Wis.; Billy L. Born, Rockford, Ill.

[73] Assignee: Stoelting, Inc., Kiel, Wis.

[21] Appl. No.: 918,244

[22] Filed: Jun. 23, 1978

Related U.S. Application Data

[62] Division of Ser. No. 718,744, Aug. 30, 1976, Pat. No. 4,156,384.

[51] Int. Cl.³ .............................................. A23C 19/02
[52] U.S. Cl. ...................................... 426/582; 99/459; 99/465; 426/478; 426/491
[58] Field of Search ............... 426/491, 478, 495, 582, 426/36; 100/118, 153; 99/452, 460, 466, 458, 459

[56] References Cited

U.S. PATENT DOCUMENTS

| | | | |
|---|---|---|---|
| 2,846,944 | 8/1958 | Willmes et al. | 100/153 |
| 2,867,537 | 1/1959 | Whitaker | 426/582 |
| 2,980,538 | 4/1961 | Wolf | 99/458 X |
| 3,446,139 | 5/1969 | Coffelt | 100/118 |

*Primary Examiner*—David M. Naff
*Attorney, Agent, or Firm*—Wheeler, Morsell, House & Fuller

[57] ABSTRACT

Liquid such as water or whey is removed from soft particulate food solids such as Cottage cheese curd utilizing a pressing belt for high speed gradual compression without significant damage to the food solids. This is accomplished by compressing the food solids in a variable cross-sectional area separation zone between a belt and a support surface such as a foraminous drum and regulating the cross-sectional area of the zone in response to changes in thickness of food solids in the zone to maintain substantially constant pressure of the belt on the food solids to avoid damaging pressure on the food solids. When the food is Cottage cheese curd, accelerated absorption of cream dressing can be obtained by adding the dressing to the curd after discharge from the separation zone before the curd completely expands from the compressed state so that the expanding curd sucks up the cream dressing as it expands.

10 Claims, 8 Drawing Figures

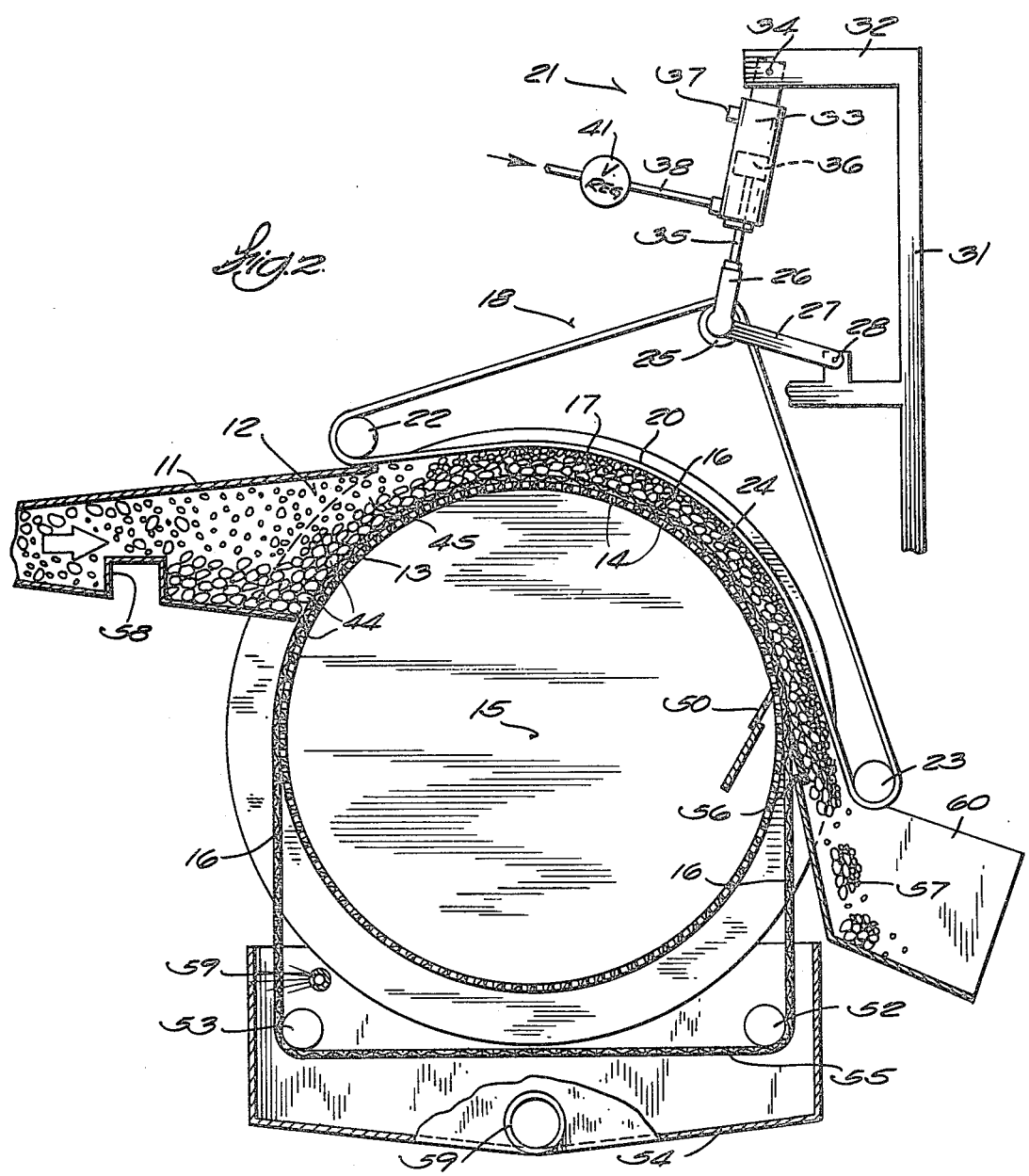
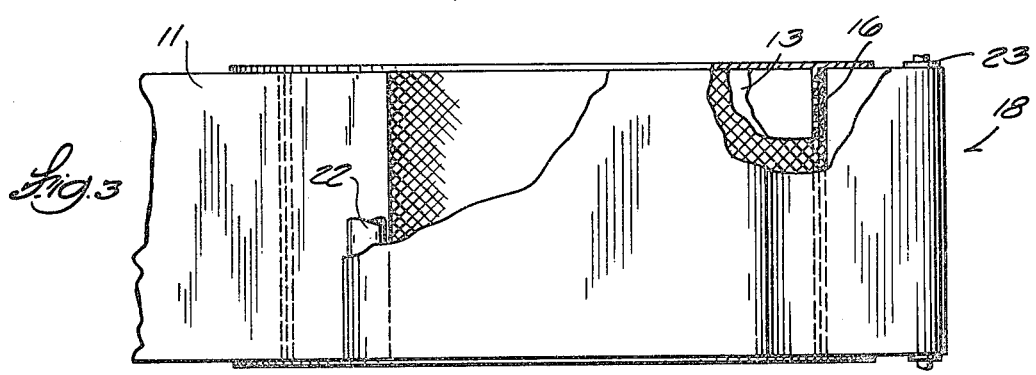
Fig. 2
Fig. 3

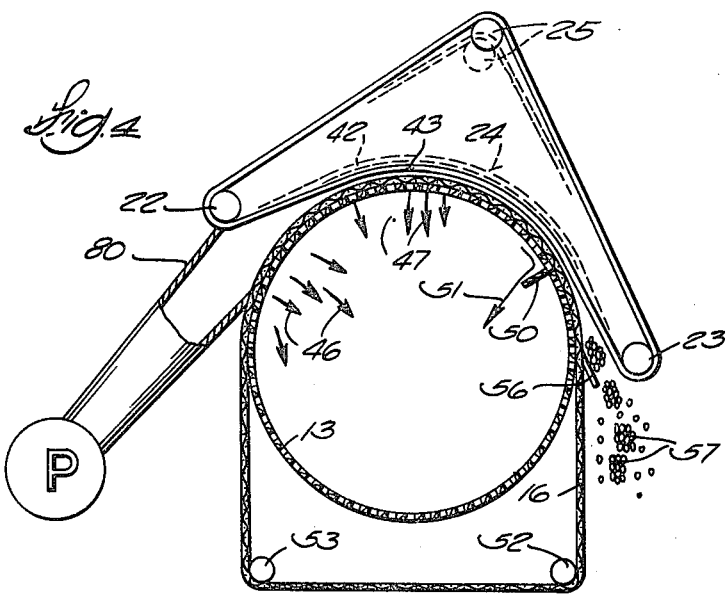
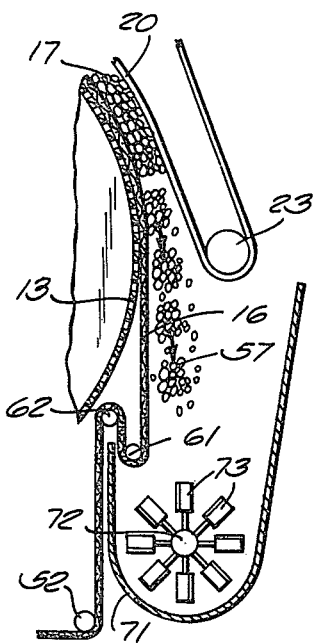
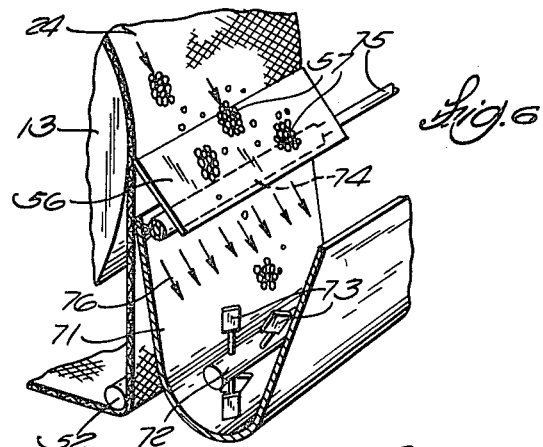
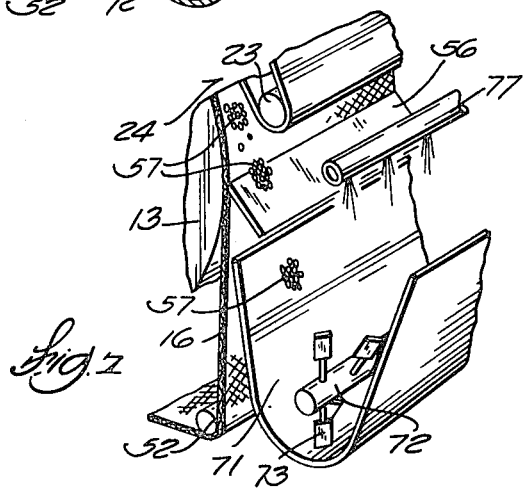

METHOD OF SEPARATING LIQUID FROM SOFT PARTICULATE FOOD SOLIDS

CROSS REFERENCE TO RELATED APPLICATION

This application is a division of our copending U.S. patent application Ser. No. 718,744 filed Aug. 30, 1976, now U.S. Pat. No. 4,156,384.

BACKGROUND OF THE INVENTION

Prior attempts have been made to utilize belt pressure to compress cottage cheese curd for dewatering the curd. U.S. Pat. No. 2,980,538 shows a prior art effort along this line in which a belt is trained along a rectilinear path to compress cheese curd against a wire mesh support screen. In the technique illustrated in that patent, however, the belt and wire screen are backed up by rollers and the pressure of the belt on the cheese curd varies, depending upon the thickness of the curd bed. Accordingly, any increase in the depth of the bed at the input end of the separating zone can result in excessive pressure on the curd and tends to break up the curd into smaller pieces and to otherwise damage the curd. Such excessive pressure will also close the drainage channels between the curd particles and thus inhibit drainage of whey and other intermixed water from the curd. A reduction of bed thickness at the input end of the separating zone can relieve belt pressure on the bed to reduce the squeezing action of the belt on the bed and result in inadequate dewatering of the cheese curd. U.S. Pat. No. 3,887,718 shows another technique for dewatering cottage cheese curd, by flowing the curd down an inclined rod screen. However, this technique does not adequately dewater the curd particles.

SUMMARY OF THE INVENTION

An important object of the present invention is to utilize a pressing belt for high speed gradual compression and dewatering of soft particulate food solids, but without damaging the food particles. Cheese curd is an important example. This is accomplished in accordance with the present invention by forming the belt and an underlying foraminous support into a variable cross-sectional area separation zone in which the belt can flex and yield away from the foraminous support to various degrees, depending upon the thickness of the layer or bed of the soft particulate food solids therebetween. Accordingly, increases in bed thickness which would otherwise result in excessive pressure is automatically accommodated for by movement of the belt away from the forminous support so that the pressure on the bed remains the same, regardless of its thickness and with minimum damage and breakage of the particles. Conversely, reduction in bed thickness is automatically accommodated for by movement of the belt toward the foraminous support to maintain dewatering pressure on the bed.

Another important feature of the invention is provision for a settling chamber at the input to the separating zone and within which larger solid particles may settle to the bottom of the chamber and onto the foraminous support. These larger particles will layer or lie together in a bed and form a filter which will intercept and inhibit loss of finer particles through the perforations of the foraminous support, thus retaining most of the fine solid particles in the layer.

The compression of the solids in accordance with the present invention is also utilized to speed up and improve the addition of another liquid to the solids, in a process step which sometimes follows withdrawal of the solids from the dewatering zone. This technique is especially applicable where the solids are cottage cheese curd and the other liquid comprises a cream dressing. As the belt pressure is relaxed, the solid particles tend to expand. While the solids are still in a compressed or partially compressed state, they may be added into or coated with cream or like dressing, or another liquid, which is added at this point so that the expansion of the solid particles will draw the cream or other liquid into the pores and/or voids in the solids as they open up. This technique accelerates absorption of the liquid into the solid particles.

Other objects, features and advantages of the invention will appear from the disclosure hereof.

DESCRIPTION OF THE DRAWINGS

FIG. 2 is a vertical cross section taken through the apparatus shown in FIG. 1.

FIG. 3 is a plan view of the apparatus shown in FIGS. 1 and 2, portions being broken away and shown in section.

FIG. 4 is a diagrammatic view of the apparatus of FIGS. 1, 2 and 3, but illustrating a modified form of supply.

FIG. 5 is a fragmentary diagrammatic view of a modified mesh belt pulley arrangement.

FIG. 6 is a fragmentary diagrammatic view of a modified embodiment in which cottage cheese curd is creamed.

FIG. 7 is a fragmentary diagrammatic view of another modified embodiment in which cottage cheese curd is creamed.

FIG. 8 is a fragementary diagrammatic view of a modified embodiment in which an alternate mounting arrangement for the discharge roller of the pressure belt is illustrated.

DESCRIPTION OF THE PREFERRED EMBODIMENTS

Figure 1:
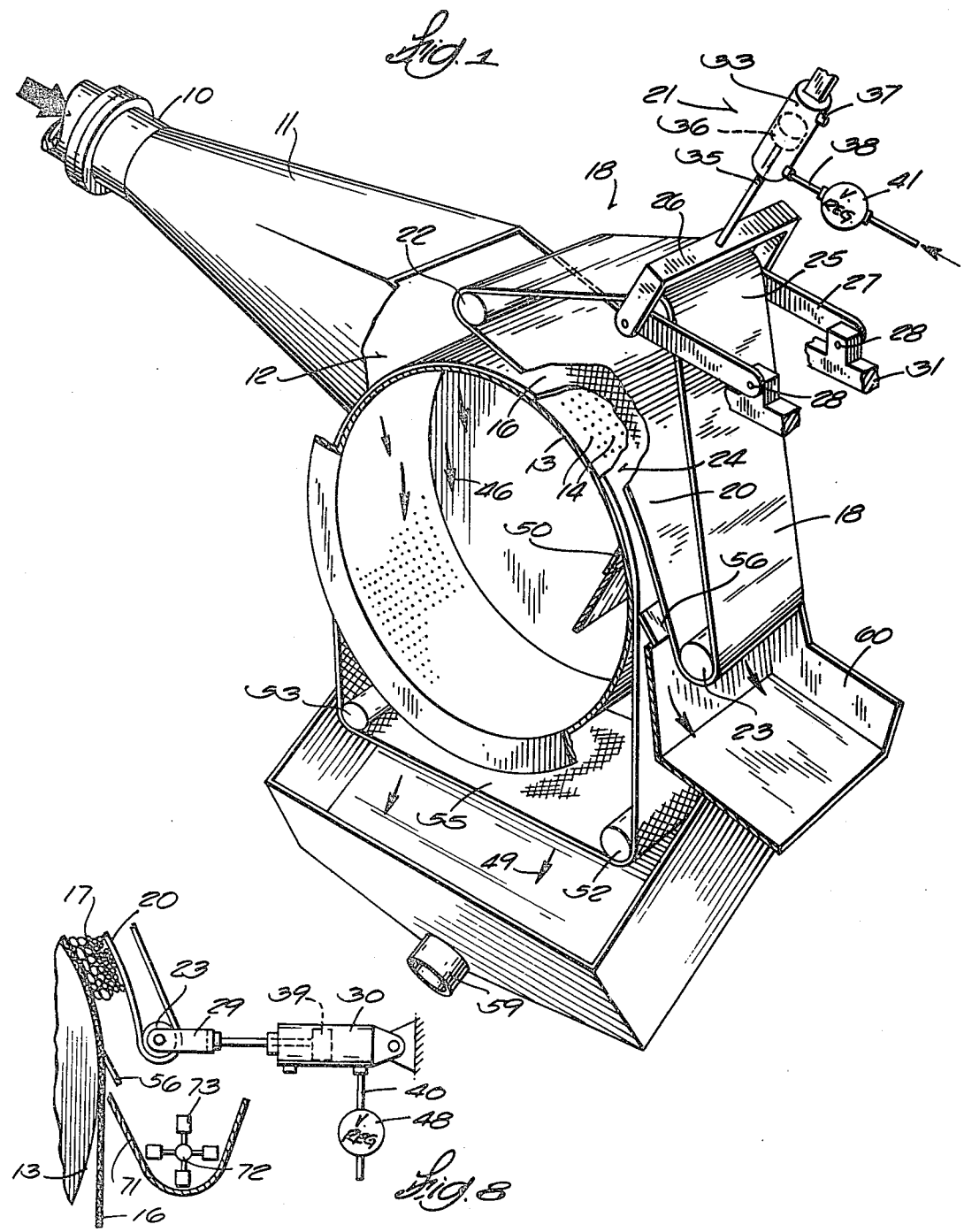
FIG. 1 is a perspective view of apparatus embodying the invention, portions of the apparatus being broken away and shown in section to expose interior details.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The method and its implementation involves the separation of a liquid from a solid, such as the removal of wash water from washed cottage cheese curd to prepare the curd for creaming, but not limited to this example. Whey may be similarly removed from curd before washing it for cottage cheese, or from other curds that are to be washed, or simply to remove a maximum amount of whey from any curd whether or not it is to be washed. Many other liquids and solids may be similarly separated. This method provides a maximum retention of solids in the solids discharged and a minimum of solids going into the liquid effluent stream.

Additionally, liquid is gently pressed out of the solid particles as well as removing liquid by collapsing voids between the solid particles. The pressing is gradual because of the tangential relationship of the belt to the drum. A maximum or other controlled level of liquid removal is achieved.

The solids discharged with a reduced liquid content are in a compressed state from which state they will expand, drawing into the solids any surrounding fluid. This is an advantage in achieving a fast and uniform penetration when a dressing or other liquid is to be added to the solids.

While cottage cheese curd is a prime example of the particulate food solids for which the present method and apparatus has utility in separating the liquid from the solids, the method and apparatus of the invention also has utility for other soft particulate foods, such as stirred curd cheese, Monterey Jack cheese, cheddar cheese, and other soft foods such as cooked macaroni and the like, which are dewatered or drained prior to canning and like operations.

In the embodiments of the invention shown in FIGS. 1, 2 and 3, intermixed liquid and soft particulate food material is fed on a substantially horizontal path through duct 10 to a settling chamber 11 having its discharge mouth 12 over a portion of the surface of a perforated drum 13. Drum 13 has perforations 14 which can be of various sizes arranged in various patterns. In one embodiment, the holes 14 are 3/32" in diameter disposed on 5/32" staggered centers (60° pattern). This provides a 32% open area. Drum 13 rotates on a substantially horizontal axis 15 and for minimum suspended solids in drain water may be wrapped over a portion of its surface with a woven belt 16 having mesh openings smaller than perforations 14. In one embodiment, the belt mesh is 68 strands by 52 strands per inch and each strand is 0.0087" in diameter. This produces an open area of 19.3%, which forms a finer screen than the perforated drum 13. The drum alone, where no mesh belt is used and the composite perforated drum and mesh belt, where a mesh belt is used, constitutes a foraminous support for a bed 17 of particulate food material. The foraminous support also forms the bottom wall of a separation zone 24, the top wall of which comprises an imperforate flexible belt 18 having a working run 20.

Belt 18 is trained over rollers 22, 23 respectively disposed at the input end and discharge end of the separation zone 24. The belt is subject to the pressure of a belt tightener 21 which includes a roller 25 suitabley mounted such as on a U-shaped bracket 26, mounted to swing on the corresponding ends of swing arms 27 used to make the belt run true or track. Swing arms 27 have opposite corresponding ends mounted on pintles 28 to a fixed frame 31. Frame 31 also has an overhanging bracket arm 32 to which one end of a single-acting fluid motor 33 is pivotally attached on pintle 34. Fluid motor 33 desirably comprises a pneumatic cylinder having a piston rod 35 connected to the U-shaped bracket 26. The cylinder 33 has an internal piston 36 connected to the piston rod 35. As best shown in FIGS. 1 and 2, piston 36 is subject to air pressure furnished through line 38 to the cylinder space below the piston 36. The space above the piston 36 is provided with a vent 37.

Air pressure provided through line 38 is regulated by the regulator 41 to maintain a predetermined desired tension on the belt 18 which will permit belt run 20 to yield and flex to accommodate for various thicknesses of the bed 17, depending upon the quantity of soft particulate food material fed into the separating zone 24 through the duct 10 and settling chamber 11.

The belt 18 is "loaded" such as pneumatically, to press the solids in a manner so that the belt yields without changing the applied pressure if the layer of solids should change as the result of normal process variations. Pressing is used to reduce or eliminate voids between particles of solids, and also to expel fluid also from pores within the solids.

Solids are conveyed on the surface of the perforated drum 13 and/or mesh belt 16. Drum 13 turns with a surface speed for the solids, the same as the surface speed of the belt run 20, so that there is no sliding motion between the drum and the belt to damage the solids. One method is to drive only the belt, which by friction, advances the solids on the drum so that both surface speeds are the same when pressure is applied in the contact zone, in the range of 90° to 120° of arc of the drum or more. The drum could be driven also, but the rotational speed of the drum should be changed as the composite diameter of the drum and solids layer 17 is changed with thicker and thinner layers of solids on the drum, to prevent slippage between the solids and the belt.

The application of pressure on the solids is desirably always the same for one type of solids in the bed 17, whether there be a light load of solids on the drum, such as a ½" to 1" layer, or a heavier load such as 2" or more, appropriate for the nature of the solids. This is achieved by belt tightener 21.

It is important to the present invention that the bed 17 be free to become thinner or thicker, subject only to the predetermined resistance of belt run 20 which is set by regulator 41. In the embodiment of FIGS. 1 and 2 and 3, this is achieved by spacing pulleys or rollers 22, 23 from the foraminous support 13, 16 a distance at least as great as, and preferably greater than, the maximum thickness of the bed 17. Thus, as illustrated in FIG. 4, the broken line 42 indicates in that particular embodiment the position of the belt run 20 for about a 4" thick bed 17. The belt in its full line position 43 indicates approximately a ½" thick bed 17. The rollers 22, 23 are spaced from the foraminous support surface about 6". Accordingly, the rollers 22, 23 are not within the separation zone 24 and do not impose damaging pressure on the soft particulate food material in the zone 24. The belt run 20 is tangent to the top surface of bed 17, both near the intake roller 22 and the discharge roller 23. In this embodiment, the pressure of belt run 20 is imposed gradually on the bed 17 and is released gradually from the bed 17.

FIG. 8 shows a modification in which the pressure of belt run 20 is released abruptly from the bed 17 at its discharge from the separating zone 24. Here discharge roller 23 is supported by a bracket 29 (similar to bracket 26 for cylinder 33) loaded by a single-acting air cylinder 30 having a piston 39 subject to the air pressure of line 40 as regulated by regulator valve 48. Valve 48 is set to produce a yielding force on roller 23 toward the solids bed 17 substantially equal to the force of belt run 20. Accordingly, the roller 23 will yield away from and advance toward the drum 13 in response to changes in thickness of bed 17 in the same manner as belt run 20.

In the illustrated embodiment, zone 24 extends about 90° to 120° of the total arc of the drum, although longer or shorter zones could be used.

The physical structure of the separating chamber as above-described results in the separating zone 24 having a variable cross-sectional area, depending upon the proximity of the belt run 20 to the foraminous support surface and this will depend upon the thickness of the bed 17. Regardless of the thickness of bed 17 and the consequent spacing of belt run 20 from the foraminous support surface, the pressure of the belt 20 on the bed 17 will remain substantially constant because of the belt tightening mechanism hereinbefore described.

Where the soft particulate food material is cottage cheese curd, regulator 41 is set to provide a belt pressure on the cheese curd bed 17 of about one pound per square inch of belt surface. This pressure can range considerably, depending upon circumstances. For example, it can be as low as ½ psi and as high as 2 psi, and even lower and higher, depending upon circumstances. In any event, the selected pressure remains constant while processing the particular batch of solids. Pressures in the aforesaid ranges have been found to be satisfactory for compressing the curd bed 17 to express intermixed liquids such as wash water or whey therefrom.

The compression of solids is for either or both of two purposes—to remove liquids to the desired level of liquid content quickly and continuously, with control——and to deliver compressed solids through a rapid discharge arrangement so they expand in a fluid which it is desired to have the solids absorb quickly. Solids such as cottage cheese curd are drained in conventional prior art apparatus in time periods ranging usually from 30 minutes to 120 minutes (without predraining which may reduce drain time to as little as 10 minutes). Subsequently, dressing is conventionally given from 5 to 20 minutes or more of absorbing time. In this new, continuous process, curd may be pressed and held in the range of 5 to 10 seconds, more or less, and followed by absorption in a time of 15 seconds to a minute, more or less.

The material to be dewatered is supplied through the duct 10 into the settling chamber 11. Settling chamber 11 is desirably formed with a baffle 58 which intercepts the flow and creates turbulence in the mixture before the mixture settles on the foraminous support 13, 16. Where the solids are cottage cheese curd, at this point in the process the curd has been previously subject to the washing and dewatering actions for washing in a cottage cheese processing tank where it would ordinarily be left to drain by a gravity draining process taking considerable time for its completion, for example, one-half hour to several hours. The present invention speeds up the draining and dewatering step to reduce this time to approximately 5 to 20 seconds, depending upon the speed of rotation of the drum 13. Where the drum rotates at about two rpm, the dewatering step takes about 20 seconds.

As cottage cheese curd is supplied through the duct 10, dispersed in water it contains about 15% solids. The dewatering of cottage cheese curd in the disclosed manner is regulated to upgrade it to about 20% solids, with essentially no "free water".

This invention takes advantage of the fact that large curd particles settle more quickly than smaller ones, and they will travel along a suitably inclined plane which is submerged and along which there is a flow toward the drum. The depth and distance as well as the flow and the turbulence will determine the magnitude of selectivity to first deliver larger curd particles to the perforations in the drum as it rotates to bring them upward into the bottom of the supply chamber. Large pieces cover the holes and more curd stacks up on top of them as the water flows through voids between them. Generally progressively smaller particles of curd then settle and/or are propelled to form the bed 17. The solids thus form a free flow filter bed, much as gravel is used to filter water. Smaller particles of curd are held back from the drain-water flow, lodging in the curd bed. Thus, the fine particles of curd do not militate against the flow of reasonably clear water, nearly free of fines, through the filter bed. The retention of as nearly as possible all of the solids is important for minimizing economic loss and for reducing the load on waste or recovery systems.

As the solids enter the settling tank 11, the large and small particles are more or less uniformly dispersed through the mass of material. As hereinbefore explained, the large particles 44 tend to settle-out and sink to the bottom of the settling chamber 11 and will array themselves in a bed over the foraminous support 13, 16 which forms the bottom wall of the chamber 11. The fines 45 will collect on the upper surface of the larger particles 44. The larger particles 44 function as a filter to prevent loss of fines 45 through the openings in the foraminous support 13, 16, thus reducing loss of these fines and retention of the maximum amount of solids.

Free liquids in settling tank 11, such as whey, wash water, etc., will tend to cascade through the foraminous support 13, 16 as illustrated by the arrows 46 in FIG. 1. As the drum 13 turns, it will advance the solids bed 17 into the separation zone 24 and subject the solids to the yielding pressure of belt run 20, thus compressing the bed 17 and squeezing additional free liquids such as whey from the interstices between particles and expressing some of the whey from the pores of the particles. The pressure of belt run 20 on the curd bed 17 is desirably just enough to eliminate void spaces between particles, and to controllably expel liquids as necessary from pores within the particles, thus to dewater the curd without breaking the curd or subjecting it to damaging pressure and abrasion which would break up the larger particles and increase the number of fines. The whey and other liquid pressed from the curd falls through the foraminous support 13, 16 as indicated by the arrows 47 in FIG. 4.

Near the end of the separation zone 24 the inside of the perforated drum 13 is provided with a wiper blade 50 which will strip from the interior of the drum surface any liquid tending to adhere thereto and this liquid will also flow or drip downwardly onto the bottom of the drum as indicated by arrow 51 in FIG. 4. Alternatively, such liquid 51 may be evacuated by suction.

In one embodiment which includes the mesh belt 16, the belt is separated from the external surface of the drum 13 by running the mesh belt 16 over guide rollers 52, 53, which are materially spaced from the drum 13, thus to strip the belt 16 from the drum surface and open up or free the perforations 14 in the drum 13 and permit the liquids flowing on paths 46, 47 and 51 to freely drain through the drum 13 from the inside-out and onto a drainage chute 54 to flow in the direction of arrows 49 to a drain pipe 59 and thence to a point of recovery thereof. This reverse drainage from the interior of the drum 13 to its outside wall back-flush the drum 13 to wash cut fine curd particles which might otherwise tend to clog the drum perforations.

If desired, the separated run 55 of the mesh belt 16 can be washed and back-flushed by a spray of sanitized water from nozzle 59 in FIG. 2.

In one embodiment, the solids bed 17 is intercepted by a doctor blade or exterior drum wiper 56 which strips the bed 17 from the foraminous support 13, 16.

In another embodiment as shown in FIG. 5, the mesh belt 16 is utilized to strip the solids bed 17 from the foraminous support. Here, belt 16 is trained at a relatively sharp angle over a series of small diameter rollers 61, 62, and thence to roller 52. In this manner the belt is curled to peel the solids bed or cake from the belt. A doctor blade can also be used to assist in stripping the solids from the belt 16.

The discharge of solids releases the pressure on the compressed dewatered solids and deposits them continuously onto a mixer/conveyor or into another processor, such as a creamer while the solids are still in a compressed or partly compressed state. This is specially advantageous where solids are to be combined with a new fluid, such as a cream or other dressing which is desired to be absorbed into the solids. Advantages are in speed and absorption quality, when it takes place during the recovery from the compressed state by the solids, as they expand and draw the dressing into pores and/or voids in the solids as they open up.

FIGS. 1 and 2 show embodiments in which the discharged solids are not treated immediately with another liquid such as cream. The solids are delivered to a chute 60 and in the case of cottage cheese, will typically be ultimately delivered to a creamer. FIGS. 6 and 7 show embodiments in which the discharged solids are immediately treated with another liquid, such as cream, before the solids have completely recovered from their compressed state.

Solids which have been pressed, held under pressure, and then released from pressure, some without a significant holding time, tend to expand toward the original dimensions of the solid particles. In expanding, solids act like a sponge and absorb any fluid surrounding them. If desired, the solids may be discharged directly into dressing. Accordingly, as the solids are discharged into contact with such other fluid, such as a dressing, the dressing surrounds the solids as they recover from the compressed state and so the dressing penetrates the pores of the expanding solids in a manner to very quickly and very thoroughly bring about the desired absorption of dressing into the solids.

Where the solids are cheese curd, the curd will come off of the drum in the form of discrete curd particles, accompanied by relatively dry, crumbly curd cakes or clumps 57 which tend to break up as they fall. In the embodiments of FIGS. 6 and 7, these solids will be dressed immediately with another liquid, for example, cream.

In the FIG. 6 embodiment, the solids are stripped off the drum 13 by the wiper blade 56, as in the embodiment of FIGS. 1 and 2. The solids will fall upon the side wall 71 of a conveyor through at the bottom of which is disposed a suitable device 72 which both mixes and stirs the solids and conveys the solids axially. In the embodiment illustrated in FIG. 6, the device 72 comprises a central shaft having spaced paddles 73 disposed in a generally helical pattern. The flats of each paddle 73 are skewed with respect to the shaft axis. Accordingly, paddles 73 will gently mix, stir and propel the solids axially therealong. Wiper blade 56 overlaps in spaced relationship the upper margin of the trough wall 71. In the space therebetween is a multiple nozzle manifold pipe 74 through which liquid from supply pipe 75 may be sprayed to form a sheet or bed 76 of such liquid on the side wall 71 as the solids are discharged from the separation zone 24. As hereinbefore explained, discrete solid particles and clumps or cakes 57 thereof will fall into the bed of liquid 76, before the particles have fully recovered from their compressed state. Accordingly, they will suck up the liquid into the pores of the expanding solids. In processing cottage cheese, the liquid will be cream. In this manner the curd will be creamed immediately after leaving the separation zone 24, as hereinbefore explained.

Even though the creaming head 74 in FIG. 6 embodiment is below the path of falling solids, it will, nevertheless, be shielded against clogging by the falling solids because it is disposed beneath the wiper blade 56.

The mixer/conveyor 72 will perform a stirring and mixing function concurrently wiith conveying the creamed curd. Thus, the curd will be creamed within a fraction of a minute as compared to prior art devices in which creaming took a much longer period.

FIG. 7 shows a somewhat different embodiment in which many of the parts are the same but in which the cream or other liquid to be added to the expanding solids is sprayed onto the top of the falling solids by a multiple nozzle pipe manifold 77. In this embodiment, the cream is added from above, rather than from below, as shown in the embodiment of FIG. 6.

FIG. 4 also shows an alternative embodiment in which the supply may be pumped or otherwise fed under pressure to the supply chamber 80. Chamber 80 extends over an arc of the drum 13 to an extent sufficient to remove much of the liquid from the solids so that the solids hold their form and carry firmly forward on the drum, roughly drained so they can be pressed. The supply rate should be sufficient to deliver solids at a rapid rate of travel with the liquid to the face of the drum. The solids will settle against the face of the drum 13 as it rotates upwardly and enters the chamber 80. Thus solid particles are laid across the drum perforations and quickly form a layer or filter-bed to act as a self-filter and hold fine particles among the rest of the solids while the liquid flow through the interstices that are formed between particles. The arc of the drum 13 covered by the entry chamber 80 must be great enough to permit the necessary flow rate for production but not so overly great as to cause slow velocities that are not great enough to lay up solids in the equivalent of a filter bed.

What is claimed is:

1. In a method for dewatering soft particulate cheese curd in which the cheese curd is placed in a compressed state by compressing it between a belt and a surface, at least one of which is foraminous, to express water from the curd, and in which method such water is drained away from the curd, the improvement for avoiding significant damage to the curd caused by changes in the thickness of a bed of such curd between said surface and said belt, said improvement comprising the steps of providing a variable cross-sectional area separation zone between a curved surface and the belt by supporting said belt for travel over belt intake and discharge rollers respectively disposed ahead of and beyond the extent of the separation zone, said rollers being spaced away from the surface at least as far as the maximum bed thickness and leaving the belt run between said rollers unsupported so that the belt can flex and yield to accomodate beds of various thickness between the belt and the surface, and regulating the cross-sectional area of said zone in response to changes in bed thickness by tightening the belt to a desired belt tension and taking up slack in the belt to maintain said desired tension as said belt run flexes and yields to maintain substantially constant pressure of the belt on the bed and avoid imposing damaging pressure on the cheese curd regardless of bed thickness.

2. The method of claim 1 in which said step of providing a variable cross-sectional area separation zone includes the step of supporting said belt for travel over a belt roller and yieldingly supporting said belt roller.

3. The method of claim 1 wherein the surface is foraminous and plus the step of feeding a mixture of liquid and soft particulate food solids to said separation zone through a settling chamber having its bottom formed at least partially by said surface, and settling larger solids particles to the bottom of said chamber onto said surface whereby said larger particles act as a filter to inhibit loss of finer particles through such surface.

4. The method of claim 1 plus the step of stripping the curd from the surface as it leaves the separation zone and adding cream dressing to such curd before the curd completely expands from its compressed state, whereby the expanding curd will suck up the cream dressing to accelerate the addition step.

5. The method of claim 1 in which said surface comprises a perforated drum having a wall, laying a mesh belt against the drum wall in said separation zone, said mesh belt having openings smaller than the drum perforations, and separating the mesh belt from the drum wall in a drainage zone to open said drum perforations in the drainage zone.

6. The method of claim 1 plus the step of discharging the curd from the separation zone and adding cream dressing to said curd before it completely expands from its compressed state whereby the expanding curd will suck up the cream dressing as it expands.

7. The method of claim 5 plus the step of turning the mesh belt on a small radius after it leaves the drum, thus to discharge curd therefrom as the mesh belt makes said turn.

8. The method of claim 1 including the subsequent steps of discharging the curd, collecting the discharged curd and immediately adding cream dressing to the discharged cheese curd before the curd completely expands from its compressed state whereby the expanding curd will suck up the cream dressing as the curd expands.

9. The method of claim 8 in which said cream dressing is added to the expanding curd by spraying said cream dressing onto said curd as it is being discharged.

10. The method of claim 8 in which said cream dressing is added to the expanding curd by depositing the expanding curd onto a bed of such cream dressing.

* * * * *